(12) United States Patent
Cultraro

(10) Patent No.: US 8,220,603 B2
(45) Date of Patent: Jul. 17, 2012

(54) ROTARY DAMPER WITH ONE-WAY CLUTCH

(76) Inventor: Antonino Cultraro, Rivoli (IT)

( * ) Notice: Subject to any disclaimer, the term of this patent is extended or adjusted under 35 U.S.C. 154(b) by 832 days.

(21) Appl. No.: 12/132,221

(22) Filed: Jun. 3, 2008

(65) Prior Publication Data

US 2008/0302619 A1  Dec. 11, 2008

(30) Foreign Application Priority Data

Jun. 11, 2007  (IT) ................ TO2007A0412

(51) Int. Cl.
*F16D 57/02* (2006.01)
(52) U.S. Cl. .................. 188/291; 188/322.5; 192/57
(58) Field of Classification Search .......... 188/290–291, 188/293, 322.5; 192/57, 48.92; 16/50, 51, 16/82, 354
See application file for complete search history.

(56) References Cited

U.S. PATENT DOCUMENTS

| 2003/0075404 A1* | 4/2003 | Takahashi ............. 188/290 |
| 2006/0011428 A1* | 1/2006 | Hayashi et al. ......... 188/290 |

FOREIGN PATENT DOCUMENTS

| JP | 55-15652 | 1/1980 |
| JP | 08-303510 A | 11/1996 |
| JP | 09-177857 A | 7/1997 |
| JP | 10-184734 A | 7/1998 |
| WO | 2008/083417 A1 | 7/2008 |

OTHER PUBLICATIONS

Machine Translation of JP 8-303510.*

* cited by examiner

*Primary Examiner* — Robert A Siconolfi
*Assistant Examiner* — Anna Momper
(74) *Attorney, Agent, or Firm* — Hayes Soloway P.C.

(57) ABSTRACT

A rotary damper comprises a first component, a second component mounted rotatably on the first, a braking fluid interposed, between the first and the second component, and a third component mounted rotatably on the second component. The second and the third component form a lateral support surface and a lateral shaft surface which is rotatable within the lateral support surface, rolling elements being interposed between these surfaces. The arrangement is such that, in a first direction of rotation (A), the third component can rotate freely with respect to the second, and, in a second direction of rotation (B), the third component is rigidly coupled to the second. Recesses are formed on the lateral shaft surface, these recesses accommodating corresponding rolling elements and being shaped so as to create, in the second direction of rotation, a centrifugal displacement of the rolling elements such that the elements are locked between the recesses and the lateral support surface.

7 Claims, 4 Drawing Sheets

ROTARY DAMPER WITH ONE-WAY CLUTCH

BACKGROUND OF THE INVENTION

Devices of this type are normally used, in combination with spring means, in movable members such as sliding drawers or hinged hatches. More specifically, such devices are designed in such a way that, in one direction of movement of the movable member to which they are fitted, they can exert a braking action on this movement, while they are substantially inactivated, and therefore do not have this braking action, in the opposite direction of movement. Dampers of this type are generally called one-way dampers. This arrangement is particularly useful if the rotary damper, fitted in combination with a spring, is positioned in such a way that it provides no braking action when the movable member is moved, by a user's hand for example, against the action of the spring and exerts this braking action when the movable member is left free to move under the elastic return force of the spring. Thus, in one direction of rotation, the braking action is not added to the force of the spring, and therefore does not impede the movement of the movable member, while in the other direction of rotation the braking action is opposed to the return force of the spring, making the movement of the movable member less abrupt.

In particular, examples of prior art devices are described in patent applications JP 9177857 A and JP 10184734 A. JP 9177857 A describes a rotary damper comprising a first component, a second component mounted on the first component so as to be rotatable about an axis of rotation, and a viscous braking fluid interposed between the first component and the second component in order to brake the rotation of the second component with respect to the first component. The damper also comprises a third component mounted on the second component so as to be rotatable about the axis of rotation, in such a way that the second and third components delimit between them a lateral support surface and a lateral shaft surface which is rotatable within the lateral support surface, a plurality of rolling elements being interposed between these surfaces.

The lateral shaft and support surfaces and the rolling elements are positioned in such a way that the third component can rotate freely with respect to the second component in a first direction of rotation of the lateral shaft surface with respect to the lateral support surface, while the third component is coupled rigidly to the second component in a second and opposite direction of rotation of the lateral shaft surface with respect to the lateral support surface. This is made possible by means of a race positioned between the second and third components of the rotary damper for housing the rolling elements, and by means of cam portions formed on the lateral support surface, one of these being provided at the position of each rolling element.

JP 10184734 A describes a rotary damper comprising a first component, a second component mounted on the first component so as to be rotatable about an axis of rotation, and a viscous braking fluid interposed between the first component and the second component in order to brake the rotation of the second component with respect to the first component. The damper also comprises a third component mounted on the second component so as to be rotatable about the axis of rotation, in such a way that the second and third components delimit between them a lateral support surface and a lateral shaft surface which is rotatable within the lateral support surface, a plurality of rolling elements being interposed between these surfaces. The lateral shaft and support surfaces and the rolling elements are positioned in such a way that the third component can rotate freely with respect to the second component in a first direction of rotation of the lateral shaft surface with respect to the lateral support surface, while the third component is coupled rigidly to the second component in a second and opposite direction of rotation of the lateral shaft surface with respect to the lateral support surface. This is made possible by means of shaped recesses formed on the lateral support surface for housing corresponding rolling elements.

In both devices, when the third component is rigidly coupled to the second component, their combined rotation is opposed by the braking action of the viscous fluid. Conversely, when the third component can rotate freely with respect to the second component, no braking action is exerted on it by the viscous fluid present between the first and second components.

The aforementioned devices are relatively complex, since they require the assembly of a large number of components. In particular, their correct operation is dependent on the presence of a certain number of springs, associated with corresponding rolling elements in order to control the movement of the rolling elements in the housings in which they are placed.

SUMMARY OF THE INVENTION

The object of the present invention, therefore, is to provide a rotary damper of the one-way type whose structure is less complex and more reliable than that of known dampers.

In a device of this type, a plurality of recesses is formed on the lateral surface of a rotating shaft to house corresponding rolling elements, the recesses being shaped so as to create, in one of the two directions of rotation, a centrifugal movement of the rolling elements such that the rolling elements are locked between the recesses and the lateral support surface surrounding the rotating shaft. Essentially, the applicant has discovered that, by positioning recesses and corresponding rolling elements on the rotating shaft instead of on the support, the one-way clutch action provided by these elements can be provided in a simple and reliable way, and in particular without the need to fit additional elements such as springs to control the movement of the rolling elements.

BRIEF DESCRIPTION OF THE DRAWINGS

A preferred, but non-limiting, embodiment of the invention will now be described, with reference to the attached drawings, in which.

DETAILED DESCRIPTION

Figure 1:
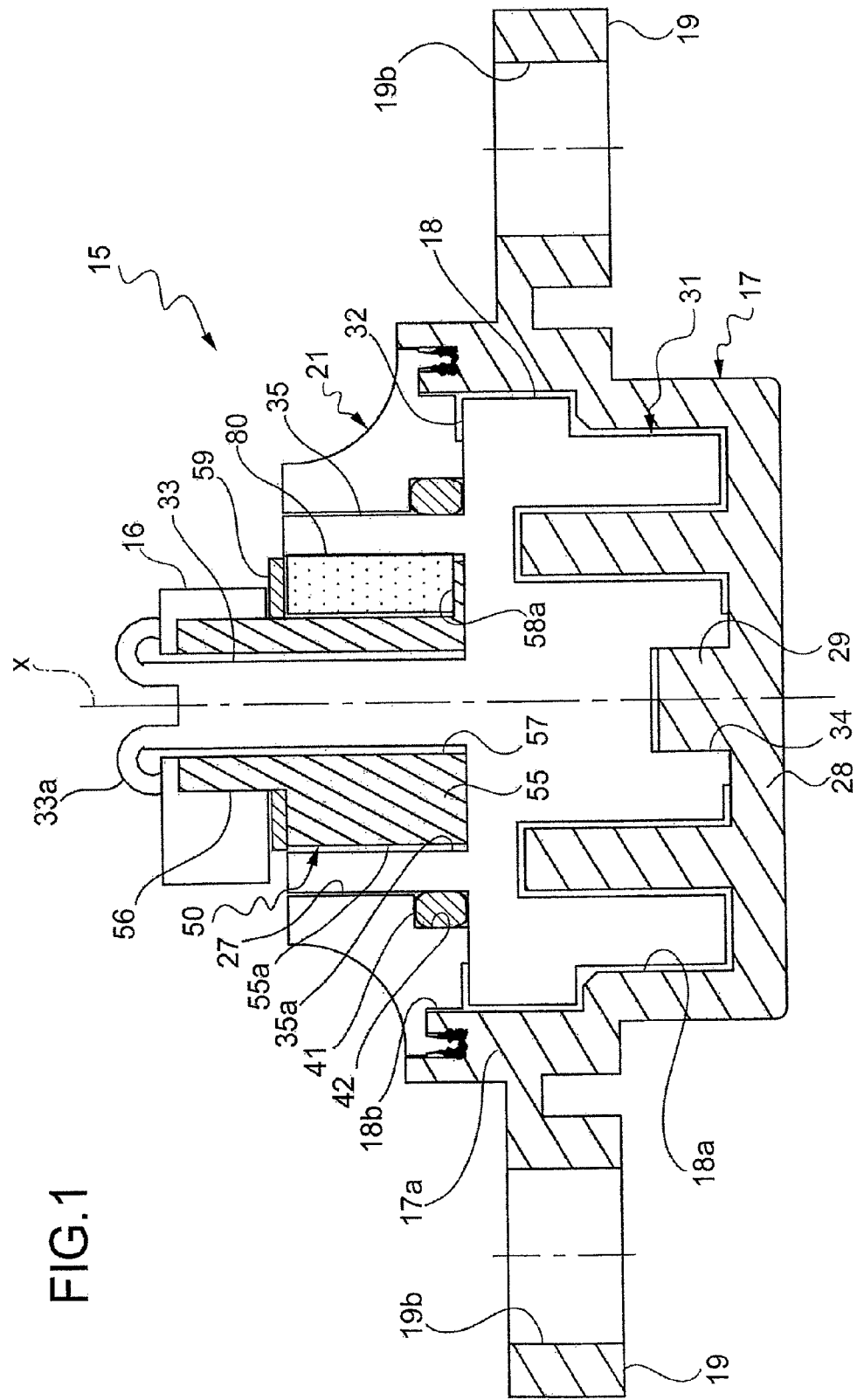
FIG. 1 is an overall sectional view of a rotary damper according to the invention.
Figure 2:
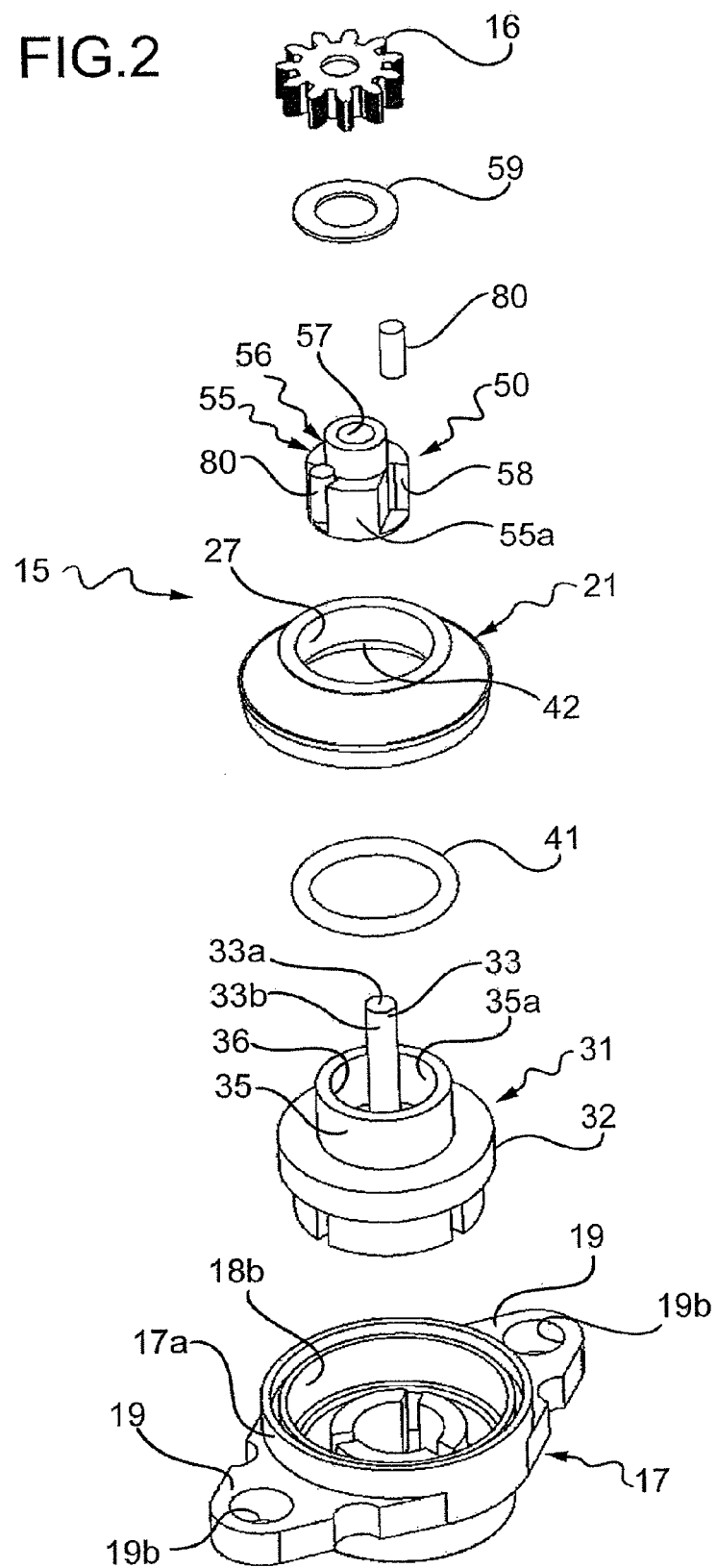
FIG. 2 is an exploded view of the damper of FIG. 1.

With reference to FIGS. 1 and 2, the reference numeral 15 indicates the whole of a rotary damper of the one-way type. This device can be associated with a movable member, such as a hinged hatch or lid (not shown) which can be opened, by hand for example, against the return action of a spring, in such a way that the movement of the hatch or lid is braked when it is released, without any negative effect at the stage when the hatch or lid is opened by hand.

In the illustrated embodiment, the rotary damper 15 is provided with a gear wheel 16 which can engage with a corresponding element, such as a rack, associated with the movable member whose movement is to be braked. However, the provision of a gear wheel as shown on the illustrated rotary damper is not essential for the purposes of the invention, since this invention is substantially applicable to any type of rotary damper.

The device 15 substantially comprises a first component 17, which in the illustrated embodiment is configured in the form of a casing. The casing 17 has a wall 17a which encloses a substantially cylindrical chamber 18 which is open at one end and is delimited laterally by the inner surface 18a of the wall 17a. The device 15 is provided with a pair of lateral flanges 19 provided with fixing means 19b. In the illustrated embodiment, these fixing means 19b are shown as fixing holes which can accommodate screws, rivets or the like for the purpose of rigidly attaching these flanges 19 to a fixed structure (not shown), to which the movable member is coupled. Clearly, the fixing means 19b could be of a different kind, being made for example in the form of resilient tabs for rapid attachment.

With reference to FIG. 1, the wall 17a of the casing 17 forms a mouth 18b at the open end of the cylindrical chamber 18. The mouth 18b of the cylindrical chamber 18 can be closed by a cover 21, which is fixed by welding to the casing 17 so as to form a hermetic seal. The welding process used is preferably ultrasonic, but it is possible to use any welding method, including for example rotary friction welding, provided that it is suitable for welding plastics components together.

The cover 21 is of substantially annular shape, and has a central through hole 27. A pivot portion 29 is formed on the base 28 of the cylindrical chamber 18, which is also the base of the casing 17, this portion projecting axially from the centre of the base 28 of the chamber 18 into the chamber.

The device 15 also comprises a second component 31 mounted on the first component (the casing) 17 so as to be rotatable about an axis of rotation x defined by the pivot portion 29. In the illustrated embodiment, the second component 31 is made in the form of an intermediate rotor which is partially housed within the chamber 18. The intermediate rotor 31 comprises a disc portion 32 which can rotate within the casing 17 and a shaft portion 33 which extends axially from the centre of the disc portion 32 and emerges from the cover 21 of the casing 17, passing through the central hole 27. The rotor 31 also has a central hole 34 formed in the base of the disc portion 32, which enables the rotor 31 to be mounted on the pivot portion 29 of the casing 17 in such a way that this rotor has the axis of rotation x.

The chamber 18 contains a highly viscous fluid of a known type, such as silicone oil, in such a way that the rotary movement of the disc portion 32 of the rotor 31 is retarded by friction with the viscous fluid. The disc portion 32 is of a conventional type, and can be made, for example, in the form of a solid disc with through holes, or can be provided with axial blades, as in the illustrated embodiment. Anyway, its shape is not essential for the purposes of the invention. Similarly, the presence of the braking fluid is not essential for the purposes of the invention, and the invention can be used with other braking means of types known in the art, provided that these means are functionally interposed between the first component (the casing) 17 and the second component (the intermediate rotor) 31.

The intermediate rotor 31 also comprises a collar portion 35 extending from the disc portion 32 of the intermediate rotor 31 on the side axially opposite the chamber 18. The collar portion 35 is coaxial with the shaft portion 33, and therefore has a radially inner surface 35a with a circular cross section which forms the radially outer limit of a cavity 36. On its radially inner side, the cavity 36 is delimited by the outer surface 33b of the shaft portion 33 of the intermediate rotor 31. The cavity 36 is therefore annular, and has a closed end delimited by the disc portion 32 of the intermediate rotor 31. The other end of the cavity 36 is open. The collar portion 35 extends axially from the centre of the disc portion 32 and penetrates the cover 21 of the casing 17, passing through the central hole 27.

The passage through the central hole 27 is hermetically sealed by an O-ring 41 accommodated in a circular housing 42 formed in the cover 21 around the central hole 27.

The device 15 also comprises a third component 50, mounted on the second component (the intermediate rotor) 31 so as to be rotatable about the axis of rotation x. In the illustrated embodiment, the third component 50 is made in the form of a terminal rotor which is partially housed within the cavity 36 formed in the intermediate rotor 31. The open end of the cavity 36 is designed to accommodate the terminal rotor 50.

Figure 5:
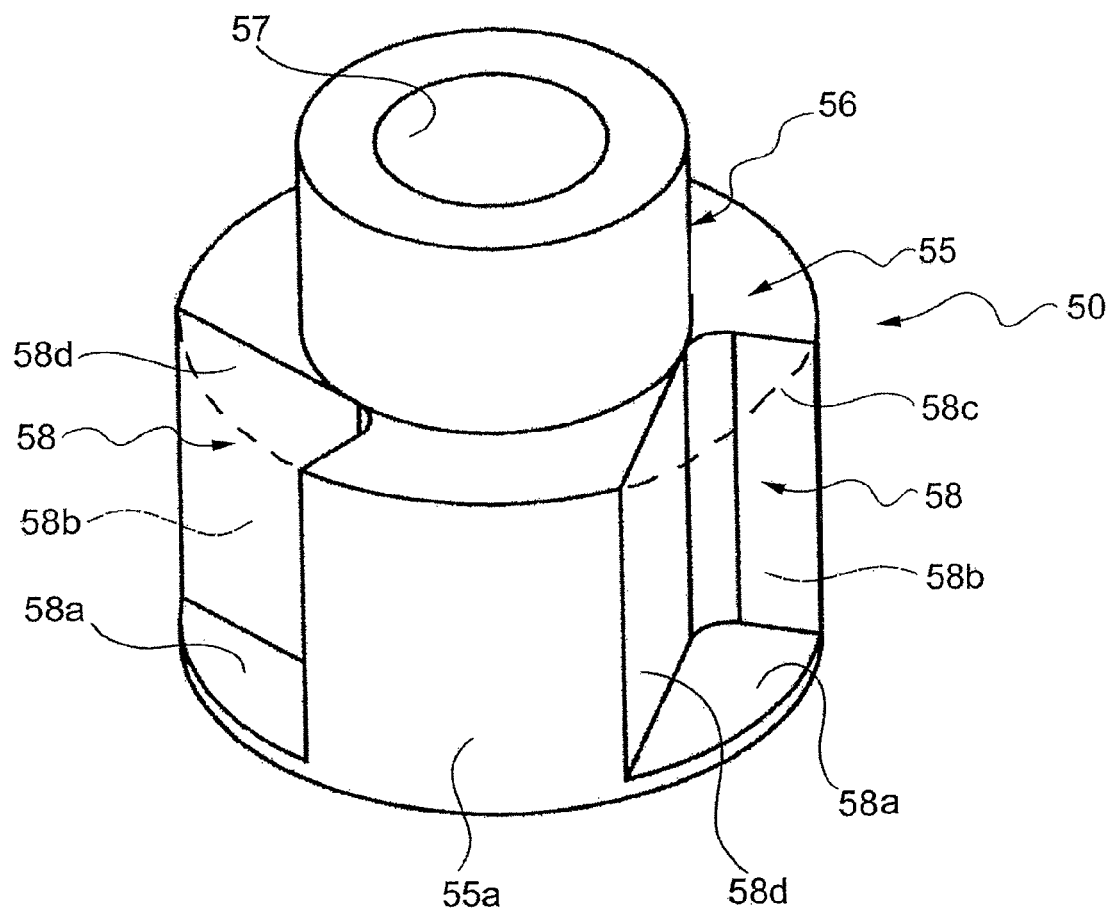
FIG. 5 is a perspective view of a component of the damper of FIG. 1.

The terminal rotor 50, shown more fully in FIG. 5, comprises a clutch portion 55 which can rotate in the cavity 36 and a fit portion 56 which extends axially from the centre of the clutch portion 55 and emerges from the cavity 36 of the intermediate rotor 31. The fit portion 56 of the terminal rotor 50 is designed to allow the mounting of the gear wheel 16. The terminal rotor 50 also has a central through hole 57 which enables the terminal rotor 50 to be mounted on the shaft portion 33 of the intermediate rotor 31 in such a way that the terminal rotor 50 has the axis of rotation x. When the terminal rotor 50 and the gear wheel 16 have been mounted, the free end 33a of the shaft portion 33 of the intermediate rotor 31 is deformed, by clenching for example, so as to prevent the gear wheel 16 from accidentally slipping off the fit portion 56 of the terminal rotor 50.

The second component (the intermediate rotor) 31 and the third component (the terminal rotor) 50 delimit between them a lateral support surface and a lateral shaft surface which is rotatable within the lateral support surface, a plurality of rolling elements 80 being interposed between these surfaces. In the illustrated embodiment, the lateral support surface is formed by the inner surface 35a of the collar portion 35 of the intermediate rotor 31, while the lateral shaft surface is formed by the radially outer surface 55a of the clutch portion 55 of the terminal rotor 50. However, this arrangement is not essential for the purposes of the invention, since the rolling elements 80 can be interposed, alternatively, between another pair of surfaces related to each other in the same way as a shaft and a support, for example between the outer surface of the shaft portion 33 of the intermediate rotor 31 and the inner surface of the through hole 37 of the terminal rotor 50.

In the illustrated embodiment, the rolling elements 80 are made in the form of cylinders with a circular cross section. These rolling elements could alternatively be made in the form of balls.

Figure 3:
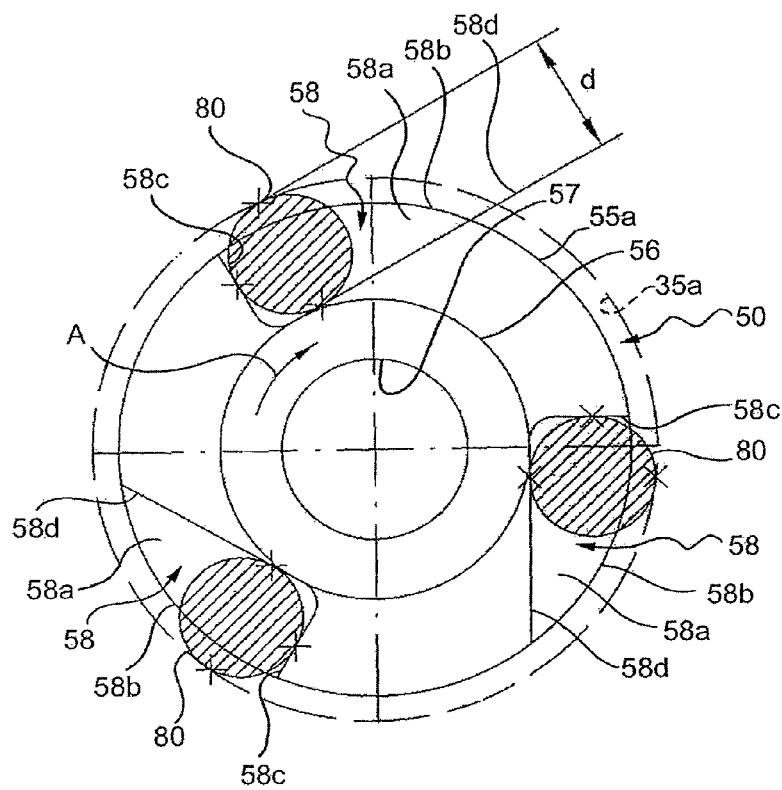
FIGS. 3 and 4 are plan views illustrating the operation of the damper according to the invention.
Figure 4:
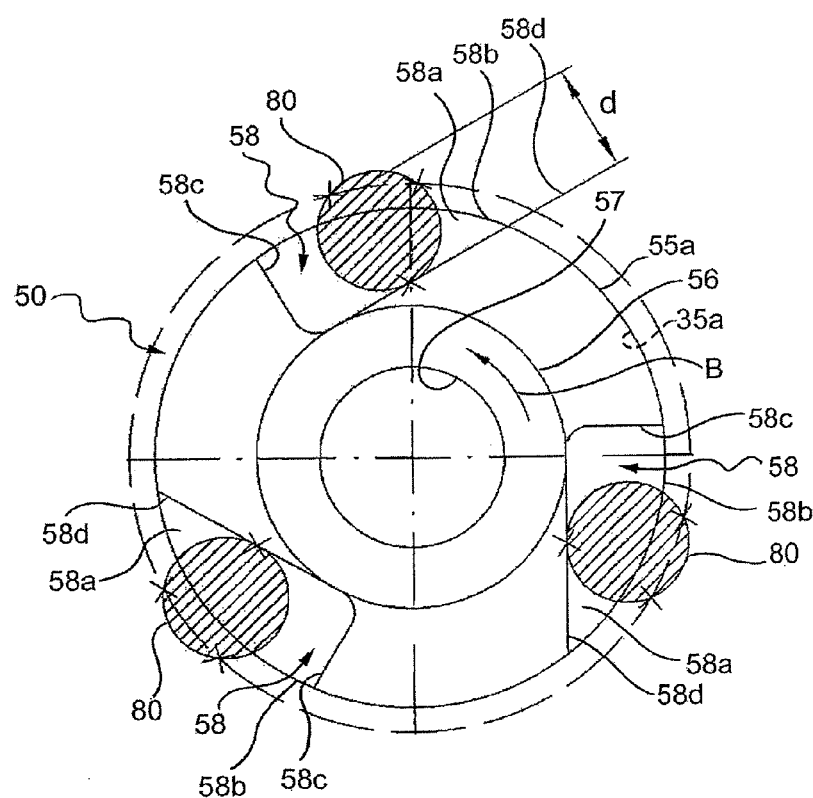

The lateral shaft surface (the radially outer surface of the clutch portion 55 of the terminal rotor 50) 55a, the lateral support surface (the inner surface of the collar portion 35 of the intermediate rotor 31) 35a, and the rolling elements 80 are positioned in such a way that, in a first direction of rotation of the lateral shaft surface 55a with respect to the lateral support surface 35a, the third component (the terminal rotor) 50 can rotate freely with respect to the second component (the intermediate rotor) 31, and, in a second direction of rotation of the lateral shaft surface 55a with respect to the lateral support surface 35a, the third component (the terminal rotor) 50 is rigidly coupled to the second component (the intermediate rotor) 31. These two conditions, namely those of free rotation and rigid coupling, are shown in FIGS. 3 and 4 respectively. The direction of rotation which allows free rotation is indicated by A, while the opposite direction of rotation which causes the rigid coupling is indicated by B.

According to the invention, a plurality of recesses 58 is formed on the lateral shaft surface (the radially outer surface of the clutch portion 55 of the terminal rotor 50) 55a, each recess 58 accommodating a corresponding rolling element 80, while the lateral support surface (the radially inner surface of the collar portion 35 of the intermediate rotor 31) 35a forms a circular track for the rolling elements 80. Additionally, each recess 58 is shaped so as to create, in the direction of rotation B for rigid coupling, a centrifugal displacement of the corresponding rolling element 80 such that the rolling element 80 is locked between the recess 58 and the lateral support surface (the inner surface of the collar portion 35 of the intermediate rotor 31) 35a.

As shown in FIGS. 1, 2 and 5, each recess 58 has a smaller extension in the axial direction than the extension in the axial direction of the clutch portion 55 of the terminal rotor 50, and it extends from the end of this portion adjacent to the connecting portion 56. Thus the recess 58 is closed at one axial end, and is open at the other. This enables a terminal support 58a to be formed for the rolling elements 80, and this, together with the fact that the connecting portion 56 has a radius smaller than or equal to the distance of the radially innermost point of the recess 58 from the axis x, enables the rolling elements 80 to be inserted axially after the terminal rotor 50 has been mounted in the recess 36 of the intermediate rotor 31. The rolling elements 80 are prevented from falling out in the axial direction by the gear wheel 16 which is mounted subsequently, or, as in the illustrated embodiment, by a washer 59 interposed between the gear wheel 16 and the clutch portion 55, this washer also being fitted on the fit portion 56 of the terminal rotor 50.

As shown in FIGS. 3 and 4, each recess 58 has a substantially triangular cross section, one side of which is formed by the aperture 58b of the recess 58 which is flush with the circumferential part of the outer surface 55a of the clutch portion 55, while the other two sides 58c and 58d are the base sides of the recess 58 formed in the surface 55a of the clutch portion 55. The first of these sides, in other words the abutting side 58c, is formed so as to face the direction of rotation A for free rotation, while the second, in other words the wedge side 58d, is formed so as to face the direction of rotation B for rigid coupling. Preferably, the two base sides 58c and 58d are placed at a right angle to each other.

The abutting side 58c of each recess 58 is designed to drive the corresponding rolling element 80 in the free rotation direction A. It is therefore intended to contact the rolling element 80 in the free rotation direction A. In the free rotation condition, the rolling element 80 is also in contact with the wedge side 58d and with the lateral support surface 35a, represented by a broken line in FIG. 3. Thus the lateral support surface 35a forms a track (for rolling only, or for rolling combined with sliding) for the rolling elements. In order to permit the free rotation of the terminal rotor 50 with respect to the intermediate rotor 31, the diameter of the rolling element 80 must be chosen in such a way that the diameter does not exceed the distance d between the points of contact of the rolling element 80 with the wedge side 58d of the recess 58 and with the lateral support surface 35a. The diameter of the rolling element 80 is substantially chosen in such a way that part of the rolling element 80 projects from the aperture side 58b of the recess 58, thus compensating for the play present between the radially outer surface 55a of the clutch portion 55 and the radially inner surface 35a of the collar portion 35.

In the direction of rotation B, the abutting side 58c moves away from the rolling element 80. The wedge side 58d is designed to guide the rolling element 80 in a centrifugal direction, as shown in an exaggerated way for the purpose of illustration in FIG. 4. The rolling element 80 therefore becomes wedged between the wedge side 58d of the recess 58 and the lateral support surface 35a. Since the distance d between the points of contact of the rolling element 80 with the wedge side 58d and with the lateral support surface 35a is smaller than the diameter of the rolling element 80, this creates an interference fit between the rolling element 80 and the lateral support surface (the inner surface of the collar portion 35 of the intermediate rotor 31) 35a such that the rolling element 80 is locked between the wedge side 58d of the recess 58 and the lateral support surface 35a.

In the direction of rotation A, therefore, the terminal rotor 50 rotates freely with respect to the intermediate rotor 31, and, since the braking fluid is interposed only between the intermediate rotor 31 and the casing 17, the terminal rotor 50 also rotates freely with respect to the casing 17. Conversely, in the opposite direction of rotation B, the terminal rotor is coupled rigidly to the intermediate rotor 31, and their combined rotation is retarded by the braking fluid interposed between the intermediate rotor 31 and the casing 17.

It is to be understood that the invention is not limited to the embodiment described and illustrated herein, which can be modified in respect of the form and arrangement of parts and the details of construction and operation, according to the possible variants that may appear useful to those skilled in the art, and which are considered to fall within the scope of the invention as defined by the claims. In particular, the invention is applicable to different types of rotary damper, for example dampers of the barrel type.

What I claim is:

1. A rotary damper, comprising a casing, an intermediate rotor mounted on the casing so as to be rotatable about an axis of rotation (x), and a braking element, functionally interposed between the casing and the intermediate rotor to brake the rotation of the intermediate rotor with respect to the casing, and additionally comprising a terminal rotor mounted on the intermediate rotor so as to be rotatable about said axis of rotation, wherein the intermediate rotor and the terminal rotor delimit between them a lateral support surface and a lateral shaft surface which is rotatable within the lateral support surface, a plurality of rolling elements being interposed between these surfaces, said lateral shaft and support surface and said rolling elements being positioned in such a way that, in a first direction of rotation (A) of the lateral shaft surface with respect to the lateral support surface, the terminal rotor can rotate freely with respect to the intermediate rotor, and, in a second and opposite direction of rotation (B) of the lateral shaft surface with respect to the lateral support surface, the terminal rotor is coupled rigidly to the intermediate rotor, wherein a plurality of recesses are formed on the lateral shaft surface, each recess accommodating a corresponding rolling element, said lateral support surface forming a circular track for the rolling elements, and each recess being shaped so as to create, in the second direction of rotation, a centrifugal displacement of the corresponding rolling element such that the rolling element is locked between the recess and the lateral support surface;

wherein each recess comprises an aperture side which is flush with the circumferential part of the lateral shaft surface, an abutting side, formed so as to face in the first direction of rotation (A) and designed to drive the corresponding rolling element in this first direction of rotation (A), and a wedge side, formed so as to face in the second direction of rotation (B) and designed to guide the corresponding rolling element in the centrifugal direction in the second direction of rotation (B); and wherein said casing comprises a pivot portion formed on the base of the casing, said pivot portion projecting axially from said base, wherein said intermediate rotor comprises a disc portion, and a shaft portion and a collar portion extending coaxially from the disc portion the shaft portion and the collar portion forming an annular cavity delimited therebetween, said intermediate rotor having a central hole formed in the disc portion, through which the intermediate rotor is rotatable mounted on the pivot portion of the casing, wherein said terminal rotor has a central through hole formed therein, through which the terminal rotor is rotatably mounted on the shaft portion of the intermediate rotor, and wherein said lateral support surface is formed by a radially inner surface of the collar portion of the intermediate rotor, and said lateral shaft surface is formed by a radially outer surface of the terminal rotor.

2. The rotary damper according to claim 1, wherein each recess is open at one axial end to permit the axial insertion of the corresponding rolling element in a mounting operation, and is closed at the other axial end so as to form a terminal support for this rolling element.

3. The rotary damper according to claim 2, wherein a retaining element is mounted on the open axial end of the recess to prevent the corresponding rolling element from falling out in the axial direction.

4. The rotary damper according to claim 1, wherein said casing comprises a wall which surrounds a chamber filled with a viscous braking fluid, and a cover mounted on and welded to the wall of the casing so as to seal said chamber, wherein said collar portion of the intermediate rotor passes through the cover, wherein said terminal rotor comprises a clutch portion, which can rotate within the cavity of the intermediate rotor, and a fit portion designed to have a gear wheel mounted on it, the fit portion extending axially from the centre of the clutch portion and emerging from the cavity of the intermediate rotor.

5. A rotary damper according to claim 4, wherein each recess is open at one axial end to permit the axial insertion of the corresponding rolling element in a mounting operation, and is closed at the other axial end so as to form a terminal support for this rolling element.

6. A rotary damper according to claim 5, wherein a retaining element is mounted on the open axial end of the recess to prevent the corresponding rolling element from falling out in the axial direction.

7. A rotary damper according to claim 6, wherein said retaining element comprises a washer mounted on the connecting portion of the terminal rotor.

* * * * *